United States Patent
Nambiath et al.

(10) Patent No.: US 8,228,980 B2
(45) Date of Patent: Jul. 24, 2012

(54) MEDIA GATEWAY WITH OVERLAY CHANNELS

(75) Inventors: Raghu Nambiath, Clarksburg, MD (US); Vivekanand Chengalvala, Montgomery Village, MD (US); Djordje Senicic, Belgrade (RS); Nagashankar Chandrashekar, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 552 days.

(21) Appl. No.: 12/474,807

(22) Filed: May 29, 2009

(65) Prior Publication Data

US 2010/0303145 A1  Dec. 2, 2010

(51) Int. Cl.
*H04N 7/12* (2006.01)
(52) U.S. Cl. .......... 375/240.01; 375/240.26; 375/240.12
(58) Field of Classification Search ............. 348/240.01; 375/240.01, 240.12, 240.26
See application file for complete search history.

(56) References Cited

U.S. PATENT DOCUMENTS

| | | | |
|---|---|---|---|
| 6,462,744 B1 * | 10/2002 | Mochida et al. | 345/543 |
| 7,010,492 B1 | 3/2006 | Bassett et al. | |
| 7,133,928 B2 | 11/2006 | McCanne | |
| 7,360,230 B1 | 4/2008 | Paz et al. | |
| 7,502,075 B1 | 3/2009 | Smith et al. | |
| 2002/0178278 A1 * | 11/2002 | Ducharme | 709/231 |
| 2006/0168291 A1 | 7/2006 | van Zoest et al. | |

FOREIGN PATENT DOCUMENTS

WO 94/27296 A1 11/1994
WO 2008/024382 A1 2/2008

* cited by examiner

*Primary Examiner* — David Czekaj
*Assistant Examiner* — Anner Holder
(74) *Attorney, Agent, or Firm* — Steven A. Shaw; W. James Brady; Frederick J. Telecky, Jr.

(57) ABSTRACT

A network media gateway is disclosed with a processor configured to include a plurality of decoder channels, a plurality of overlay channels, an overlay renderer, a video mixer, and an encoder channel. A digital signal processor embedded in a network media gateway is also disclosed, and a mixing method implemented on a digital signal processor is also disclosed.

22 Claims, 5 Drawing Sheets

MEDIA GATEWAY WITH OVERLAY CHANNELS

TECHNICAL FIELD

The technical field of the present application relates to computer graphics processing in a media gateway, and more specifically to processing overlay content in the media gateway.

BACKGROUND

There is a well established use of overlay content superimposed over channel content, such as a television network identification over the TV video stream. FIG. 6 is an illustration of a conventional media gateway 601 that is part of a larger data network 603 over which video streams and overlay content are transported. It should be understood that the media gateway 601 is included in the network 603 and not apart therefrom. The data network 603 includes $1^{st}$ through Nth servers 615 servers, each server being capable of storing video image data and overlay content data.

The media gateway 601 is configured to include a decoder channel 605, an overlay channel 607, an overlay renderer 611, a mixer 613, and an encoder channel 609. In the conventional network illustrated in FIG. 6, a single server, for example the $2^{nd}$ server 617 transmits overlay content to the overlay channel 607. The overlay content includes different types of overlay including text, graphics, or combined texts and graphics, static graphics, animated text, and the like. The overlay content received through the overlay channel 607 is passed to the overlay renderer 611 where the overlay content is decoded into "YUV" format, a color space known in the art to include measurements of luminance, red chrominance, and blue chrominance. The video mixer 613 then receives the rendered overlay content in YUV format from the renderer 611.

Approximately concurrently, the decoder channel 605 transports a decoded video stream (also in YUV format) to the mixer 613. As is known in the art, the mixer 613 then mixes the decoded video stream and rendered overlay content into a mixed stream. The mixed stream is then encoded and transported to the network via the encoder channel 609.

There are drawbacks with the above-described conventional media gateway and associated network. Initially, if the $2^{nd}$ server 617, for example, transmits the overlay content over the single overlay channel 607, if the overlay content is a combination of graphics and text, the graphics and text components can only be used in a combined manner, and only with a single video stream at a time. That is, the overlay content cannot be split up into component text and graphics, and cannot be distributed to multiple encoded mixed streams simultaneously. An additional drawback in the conventional art is that even if overlay content data is intended to be used repeatedly in multiple encoded mixed streams, a single stream at one time, the gateway 601 does not store the overlay content thereby requiring the $2^{nd}$ server 617, for example, to transmit the same overlay content every time the overlay content is to be mixed with a different video stream. This situation results in significant overhead costs, including using excessive gateway/processor and bandwidth resources.

SUMMARY

Accordingly, one embodiment described herein is a network media gateway and processor that includes: multiple decoder channels that transport multiple decoded video streams; multiple overlay channels that transport multiple overlay content; an overlay renderer that receives the multiple overlay content and outputs a first rendered overlay content that is stored in the processor; and a video mixer that receives the multiple decoded video streams and the first rendered overlay content from the processor and mixes the multiple decoded video streams with the first rendered overlay content from the processor. The processor encodes and outputs multiple encoded mixed steams to an encoder channel.

A second embodiment described herein is a digital signal processor (DSP) embedded in a network media gateway, the DSP including: a receiver that receives overlay content data as rendered overlay content pixels; a memory buffer that stores the received rendered overlay content pixels; and a processor that receives a first decoded video stream and mixes the first decoded video stream with the rendered overlay content pixels stored in the memory buffer, and that receives a different second decoded video stream and mixes the second decoded video stream with the same overlay content pixels stored in the memory buffer. Each of the pixels stored in the memory buffer is stored with the following: a beginning coordinate pair of a pixel that represents the beginning of a row of pixels on which the pixel being stored is located, an offset from the beginning coordinate pair, and payload data that includes a luminance value Y, a red chrominance value $C_r$, a blue chrominance value $C_b$, and an alpha compositing value α particular to a pixel being stored.

A third embodiment described herein is a method (implemented on a DSP) of mixing rendered overlay content pixels stored in a memory buffer and a decoded video stream, thereby forming an encoded mixed stream. Each pixel of the rendered overlay content pixels is stored with a beginning coordinate pair of a pixel that represents the beginning of a row of pixels on which the pixel being stored is located, an offset from the beginning coordinate pair, and payload data that includes a luminance value Y, a red chrominance value $C_r$, a blue chrominance value $C_b$, and an alpha compositing value α particular to a pixel being stored.

The method includes performing trans-sizing of the stored rendered overlay content pixels stored in the buffer based on a destination encoder channel; for each row of pixels stored in the memory buffer, mixing by the DSP the stored rendered overlay content pixels in the row and the corresponding row of pixels in the decoded video stream to form an encoded mixed stream according to the following equations:

$$Y_{mix} = Y_{dec} * (1-\alpha) + Y_{ov} * \alpha,$$

$$C_{bmix} = C_{bdec} * (1-\alpha) + C_{bov} * \alpha, \text{ and}$$

$$C_{rmix} = C_{rdec} * (1-\alpha) + C_{rov} * \alpha.$$

In the above equations, $Y_{mix}$, $C_{bmix}$, and $C_{rmix}$ are the luminance values, blue chrominance values, and red chrominance values, respectively, of the pixels in the encoded mixed stream. $Y_{dec}$, $C_{bdec}$, and $C_{rdec}$ are the luminance values, blue chrominance values, and red chrominance values, respectively, of the decoded video stream. $Y_{ov}$, $C_{bov}$, and $C_{rov}$ are the luminance values, blue chrominance values, and red chrominance values, respectively, of each stored rendered overlay content pixels. The method further includes outputting the encoded mixed stream.

The purpose of the foregoing summary (and the provided abstract, as well) is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The summary and the abstract are neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
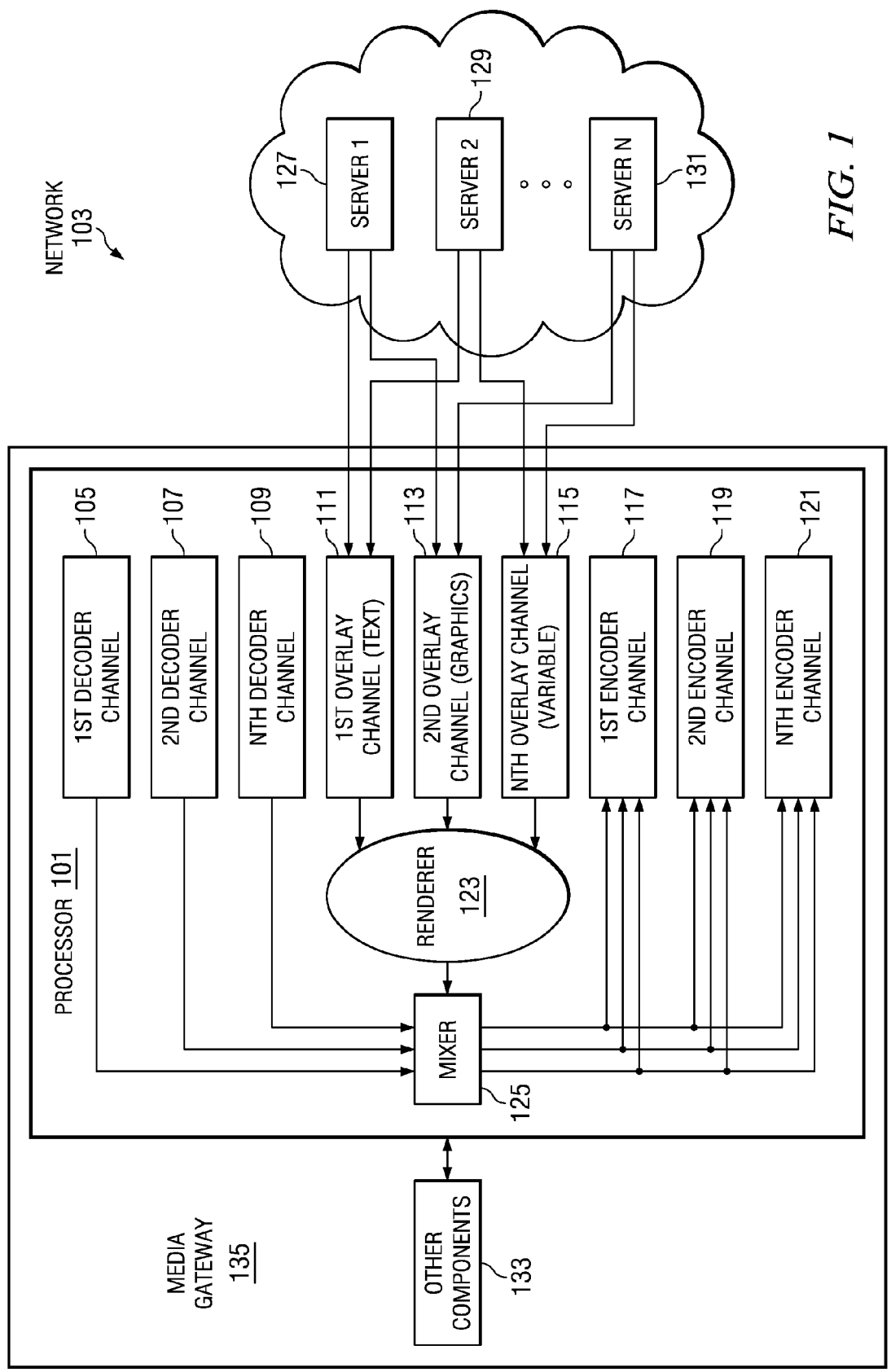
FIG. 1 is a diagram illustrating a media gateway device that is part of a larger data network.

In overview, the present disclosure concerns a media gateway device that is associated with networks supporting streaming of video images and corresponding overlay data. Such networks may provide additional services such as data communications and telecommunication services. Such networks can include network infrastructure devices which transfer the video images and overlay data between wireless and/or wire line devices. The network infrastructure devices of particular interest are those providing or facilitating video image streaming such as servers, edge routers, centralized media gateways, session border controllers, trunk gateways, media boxes, call servers, and the like, and variants or evolutions thereof. More particularly, various inventive concepts and principles are embodied in systems, devices, and methods therein for mixing overlay content in a media gateway.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e. processes or steps that are not so limited may be performed in any order.

Much of the inventive functionality and many of the inventive principles when implemented, are best supported with or in software or integrated circuits (ICs) and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

As further discussed herein below, various inventive principles and combinations thereof are advantageously employed to provide multiple overlay channels so that multiple types of overlay content can be mixed with multiple video streams to provide multiple mixed streams. Additionally, rendered overlay content can be stored in a memory buffer such that networks servers do not have to provide the overlay content for each of multiple video streams. Finally, decoded video streams and stored rendered overlay content data can be efficiently mixed such that multiple mixed streams are provided to multiple encoder channels. These inventive principles are now described in detail as they relate to the accompanying figures.

Referring now to FIG. 1, a diagram illustrating a media gateway device that is part of a larger data network will be discussed and described. The media gateway 135 is part of a larger data network 103 over which video streams and overlay content are transported. The media gateway includes a processor 101 and other components 133. The data network 103 also includes $1^{st}$ through Nth servers 127, 129, 131. The processor 101 includes $1^{st}$ through Nth decoder channels 105, 107, 109; $1^{st}$ through Nth overlay channels 111, 113, 115; $1^{st}$ through Nth encoder channels 117, 119, 121; an overlay render 123, and video mixer 125. It should be expressly noted that although there are only three servers, three decoder channels, three overlay channels, and three encoder channels illustrated in FIG. 1, any number of each may be in operation is any particular implementation; N is a positive integer as used in the FIG.

It should also be noted that the media gateway 135 is part of the data network 103. Each of the $1^{st}$ through Nth servers 127-131 stores among other things encoded video streams as well as overlay content. Typical overlay content includes text, or graphics, or combined text and graphics that can be superimposed over a video stream. Typical applications for the use of overlay content include advertisements, identifying watermarks, emergency or other information alerts, picture-in-picture where a smaller image appears within a larger image, and video conferencing. Watermarks are often business logos, and one well established use of overlay data is a television network identification over a video image. The transport of both the video streams and the overlay content from the $1^{st}$ through Nth servers 127-131 to the media gateway is completed through any of several known transport protocols, including TCP, UDP, DCCP, SCTP, RSVP, ECN, and variations and extensions thereof. This list is not meant to be exhaustive.

Figure 6:
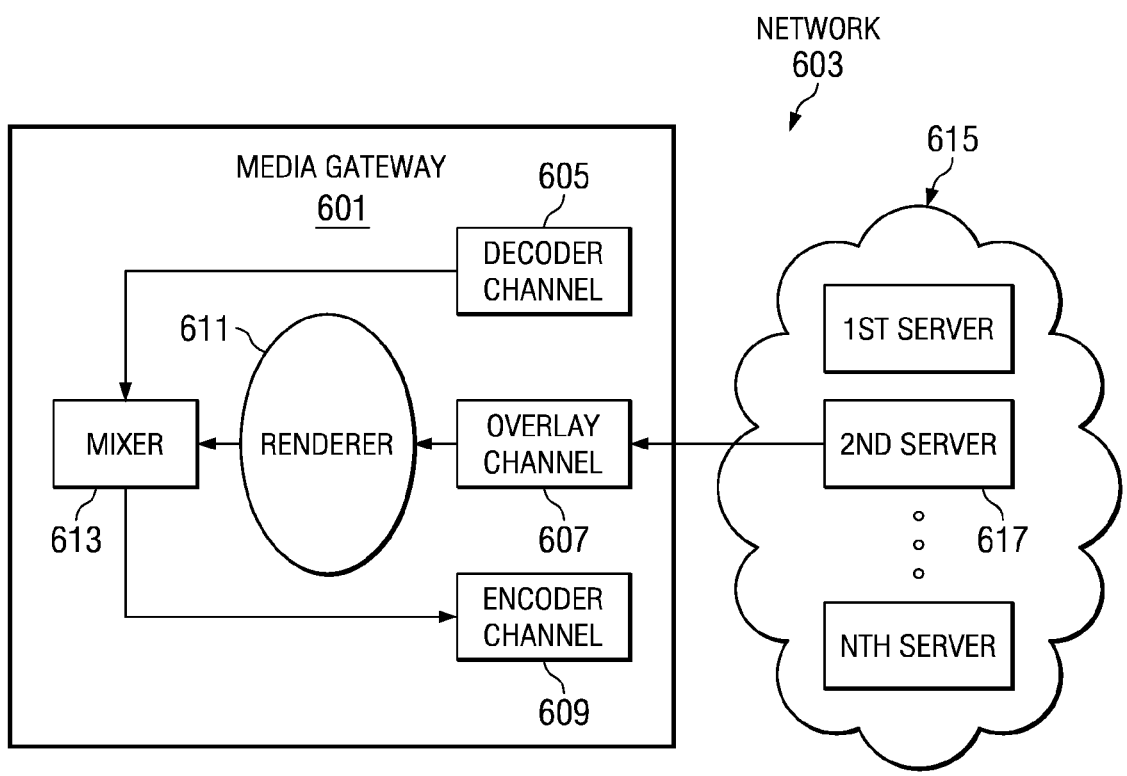
FIG. 6 is diagram illustrating a conventional media gateway device that is part of a larger data network.

In contrast to the conventional arrangement illustrated in FIG. 6, the processor 101 of the media gateway 135 is configured to provide a plurality of overlay channels 111-115. Each channel may be dedicated exclusively to receiving only text overlay, for example the $1^{st}$ overlay channel 111, while another channel may be dedicated exclusively to receiving graphics overly, for example the $2^{nd}$ overlay channel 113, while still another channel may be dedicated to a graphics and text combined overlay, for example the Nth overlay channel 115. Again, this list is not meant to be exhaustive as to the types of overlay data. Each of the 1$^{st}$ through Nth overlay channels 111-115 is configured to receive the overlay content from any of the 1$^{st}$ through Nth servers 127-131. Because of this arrangement, the overlay content is able to be "mixed and matched" with a variety of different decoded video streams. That is to say, overlay content from a single overlay channel from among the 1$^{st}$ through Nth overlay channels 111-115 at the same media gateway 135 can be mixed with a single decoded video stream transported by one of the 1$^{st}$ through Nth decoder channels 105-109 at the same media gateway 135. Alternatively, the overlay from the single channel can be received one time and then mixed with a plurality of video streams received by a plurality of the 1$^{st}$ through Nth decoder channels 105-109 at the same media gateway 135. Alternatively, the overlay content from a plurality of the overlay channels from the 1$^{st}$ through Nth overlay channels 111-115 can be combined and mixed with either a single video stream or a plurality of video streams transported by the 1$^{st}$ through Nth decoder channels 105-109 all at the same media gateway 135.

The overlay content that is received at the 1$^{st}$ through Nth overlay channels 111-115 is transported to the overlay renderer 123. The overlay renderer 123 decodes the overlay content into YUV format, as is known in the art. Once rendered, the overlay content is then stored by the processor 101 according to a scheme that is described below in more detail. Because the overlay content is stored and can persist in the storage to be used with plural video streams, it can be "mixed and matched" with various video streams, and further allows the processor to use the overlay content without continually retrieving the same overlay content from one of the 1$^{st}$ through Nth servers 127-131 on the network 103. In addition to being stored, the rendered overlay content is output to the mixer 125.

1$^{st}$ through Nth decoder channels 105-109 receive video streams from one or more of 1$^{st}$ through Nth servers 127-131, although connecting lines are not illustrated in FIG. 1 to preserve clarity. It should be noted that the video streams may either be decoded or encoded when received by the 1$^{st}$ through Nth decoder channels 105-109. If the video streams are received in an encoded state, the processor operates to decode the video streams, and the streams are then transported to the mixer 125 by the 1$^{st}$ through Nth decoder channels 105-109. If the video streams are received already decoded, the 1$^{st}$ through Nth decoder channels 105-109 simply transport the decoded video streams directly to the mixer 125.

The mixer 125 receives the decoded video streams from one or more of the 1$^{st}$ through Nth decoder channels 105-109 and the rendered overlay content from the overlay renderer 123 and then determines which of the 1$^{st}$ through Nth encoder channels 117-121 are to receive which encoded mixed stream produced by the mixer 125. This determination can be made according a stored correlation matrix, discussed in detail below, which correlates the 1$^{st}$ through Nth encoder channels 117-121 with the 1$^{st}$ through Nth overlay channels 111-115. This correlation of encoder channels with overlay content contributes to the "mixed and matched" functionality described herein. The processor can use the overlay content from one or more of the 1$^{st}$ through Nth overlay channels 111-115 to mix with one or more of the decoded video streams transported from the 1$^{st}$ through Nth decoder channels 105-109 to produce mixed streams transported by the 1$^{st}$ through Nth encoder channels 117-121. Once the determinations are made as to which encoder channels are to receive which overlay content, the mixer 125 then performs mixing discussed below in more detail, thereby forming a plurality of encoded mixed streams. The encoded mixed streams are then output to the network through one or more of the 1st through Nth encoder channels 117-121.

The "mixed and matched" functionality of the media gateway 135 and the processor 111 embedded therein provides exemplary results not found in the prior art. For example, a plurality of video streams received through 1$^{st}$ through Nth decoder channels 105-109 can be mixed with overlay content received a single time at one or more of the 1$^{st}$ through Nth overlay channels 111-115 to form a plurality of mixed streams, all of which can be output serially to a single encoder channel from among the 1$^{st}$ through Nth encoder channels 117-121. Alternatively, all of the formed plurality of mixed streams could be output simultaneously or at different times to plural encoder channels from among the 1$^{st}$ through Nth encoder channels 117-121. Alternatively, each one of the plurality of the mixed streams could be output to a corresponding different encoder channel from among the 1$^{st}$ through Nth encoder channels 117-121.

Further regarding the functionality of the 1$^{st}$ through Nth overlay channels and the mixer 125, although the processor 101 stores received overlay content, it is possible that while the mixer 125 is mixing rendered overlay content with one or more video streams, the 1$^{st}$ through Nth overlay channels 111-115 may receive entirely different overlay content to be mixed with the videos streams currently being mixed. In this case, the mixer 125 can replace the existing overlay content with the entirely different overlay content.

The other components 133 (in bidirectional contact with the processor 101) include those generally known to one of ordinary skill in the art, which when the processor is a DSP might include a hardware memory architecture designed for streaming data, separate program and data memories (Harvard architecture), special SIMD (single instruction, multiple data) operations, special arithmetic operations, such as fast multiply-accumulates (MACs), bit-reversed addressing, and a special addressing mode useful for calculating FFTs. The above list is not intended to be limiting but are simply examples of those known in the art.

Figures 2, 3:
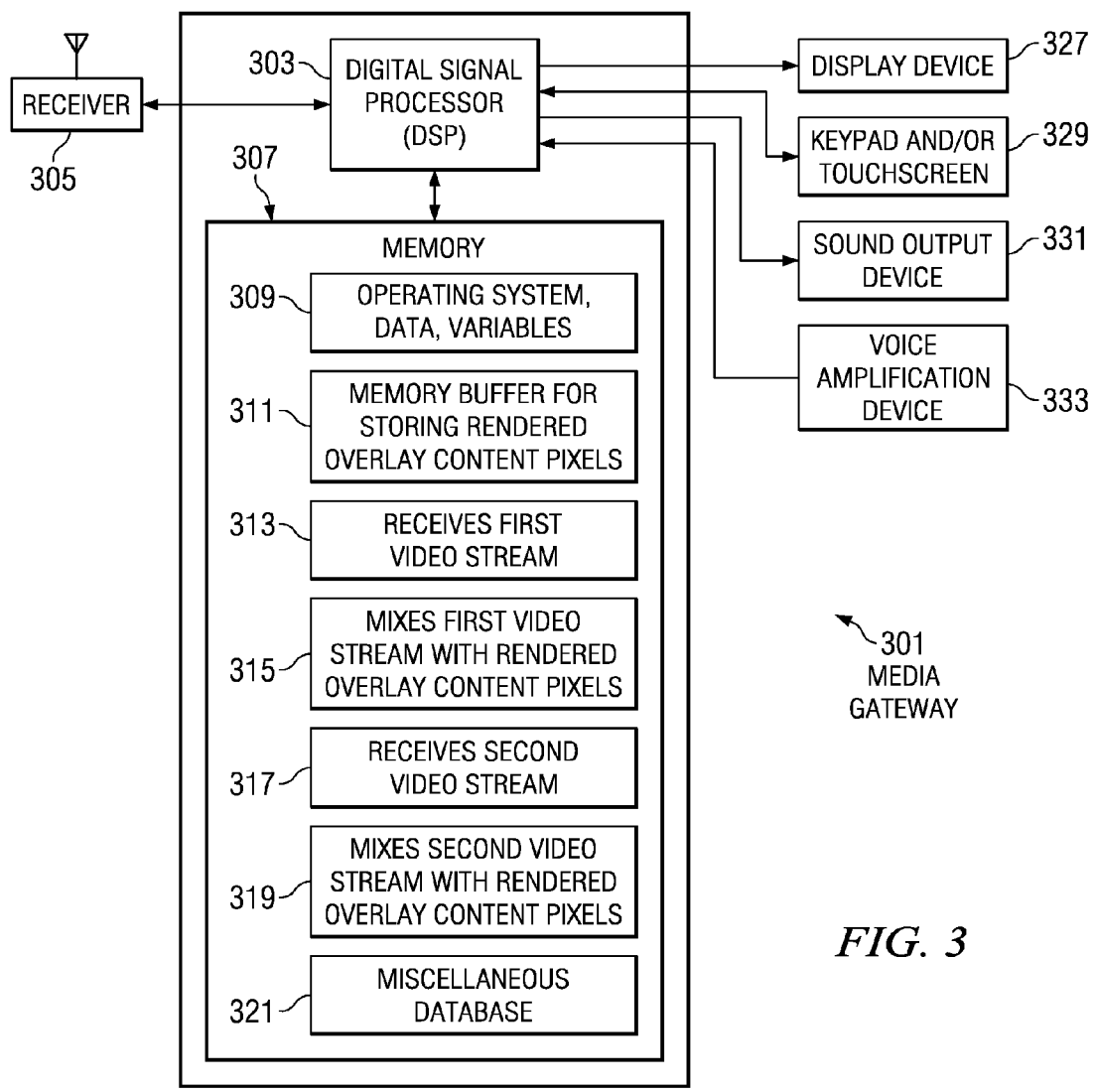
FIG. 2 is a diagram illustrating a storage scheme for storing correlation data correlating encoder channels and overlay channels in a media gateway device.
FIG. 3 is a block diagram illustrating portions of a media gateway with a DSP.

Referring now to FIG. 2, a diagram illustrating a storage scheme for storing correlation data correlating encoder channels and overlay channels in a media gateway device will be discussed and described. The storage scheme can be represented by the matrix 201. The matrix 201 is a logical representation of the example data stored in the processor that controls which overlay content is to be output with which encoder channel. The rows in the matrix are the 1$^{st}$ encoder channel 209, the 2$^{nd}$ encoder channel 211 through an Nth encoder channel 213. The columns in the matrix 201 are the 1$^{st}$ overlay channel 203, the 2$^{nd}$ overlay channel 205, through the Nth overlay channel 207. The entries in the matrix 201 indicate whether there is an interconnectedness (whether the overlay content in the particular overlay channel is to be mixed with a video stream that is transported by the particular encoder channel) between the particular overlay channel and the particular encoder channel associated with the entry, and when there is an interconnectedness, then the alpha compositing value α (also sometimes referred to herein as "alpha value") to be used in a mixing process. As an example, the entry represented at the intersection of the 1$^{st}$ encoder channel 209 and the 1$^{st}$ overlay channel 203 shows that the two channels are interconnected and a corresponding α compositing value at entry (1,1). The intersection of encoder channel 211 and overlay channel 205 shows that there is not an interconnectedness and thus there is also no α compositing value. The intersection of the Nth encoder channel 213 and the 2$^{nd}$ overlay channel 205 is also interconnected and had a corresponding α compositing value for entry (N,2).

Referring now to FIG. 3, a diagram illustrating portions of a media gateway with a DSP will be discussed and described. The media gateway 301 includes a DSP 303 operable to optionally interact with peripheral devices including a display device 327, a keypad and/or touch screen 329, a sound output device 331, and a voice amplification device 333. The DSP 303 includes a receiver 305 which is known in the art to include any circuitry for receiving signals representing overlay content data, including rendered overlay content pixels. The DSP is also coupled with the memory 307. The memory 307 may comprise a read-only memory (ROM), a random-access memory (RAM), a programmable ROM (PROM), and/or an electrically erasable read-only memory (EEPROM). The memory 307 may include multiple memory locations for storing, among other things, an operating system, data and variables 309 for computer programs executed by the DSP 303. The memory also includes a memory buffer 311 for storing rendered overlay content pixels. The memory buffer 311 is described in more detail herein.

The computer programs cause the DSP 303 to operate in connection with various functions as now described. A receives-first-video-stream function 313 causes the DSP 303 to receive a first decoded video stream from a decoder channel. A mixes-first-video-stream-with-rendered-overlay-content-pixels function 315 causes the DSP 303 to mix the first decoded video stream with rendered overlay content pixels stored in the memory buffer 311. A receives-second-video-stream function 317 causes the DSP 303 to receive a second decoded video stream from a decoder channel. A mixes-second-video-stream-with-rendered-overlay-content-pixels function 319 causes the DSP 303 to mix the second decoded video stream with the same rendered overlay content pixels stored in the memory buffer 311 that were mixed with the first video stream. The above described DSP 303 provides an advantage over a conventional DSP by reusing stored rendered overlay content pixels rather than retrieving the overlay content multiple times from a network server. As mentioned previously, reducing redundant requests of the same data decreases cost overhead. It should lastly be noted that the memory 307 additionally includes a miscellaneous database 321 for storing other data not specifically mentioned herein.

It should be noted that in order to provide storage for overlay content in the media gateway, a memory buffer should be utilized that addresses the fact that overlay data is typically very small related to the overall size of the video image. In this regard, a memory buffer must be able to store to the YUV values of the actual overlay content but discard the typical zero values associated with an area in the video image where the actual overlay content is not present. Otherwise, memory under-utilization would become significant.

Figure 4:
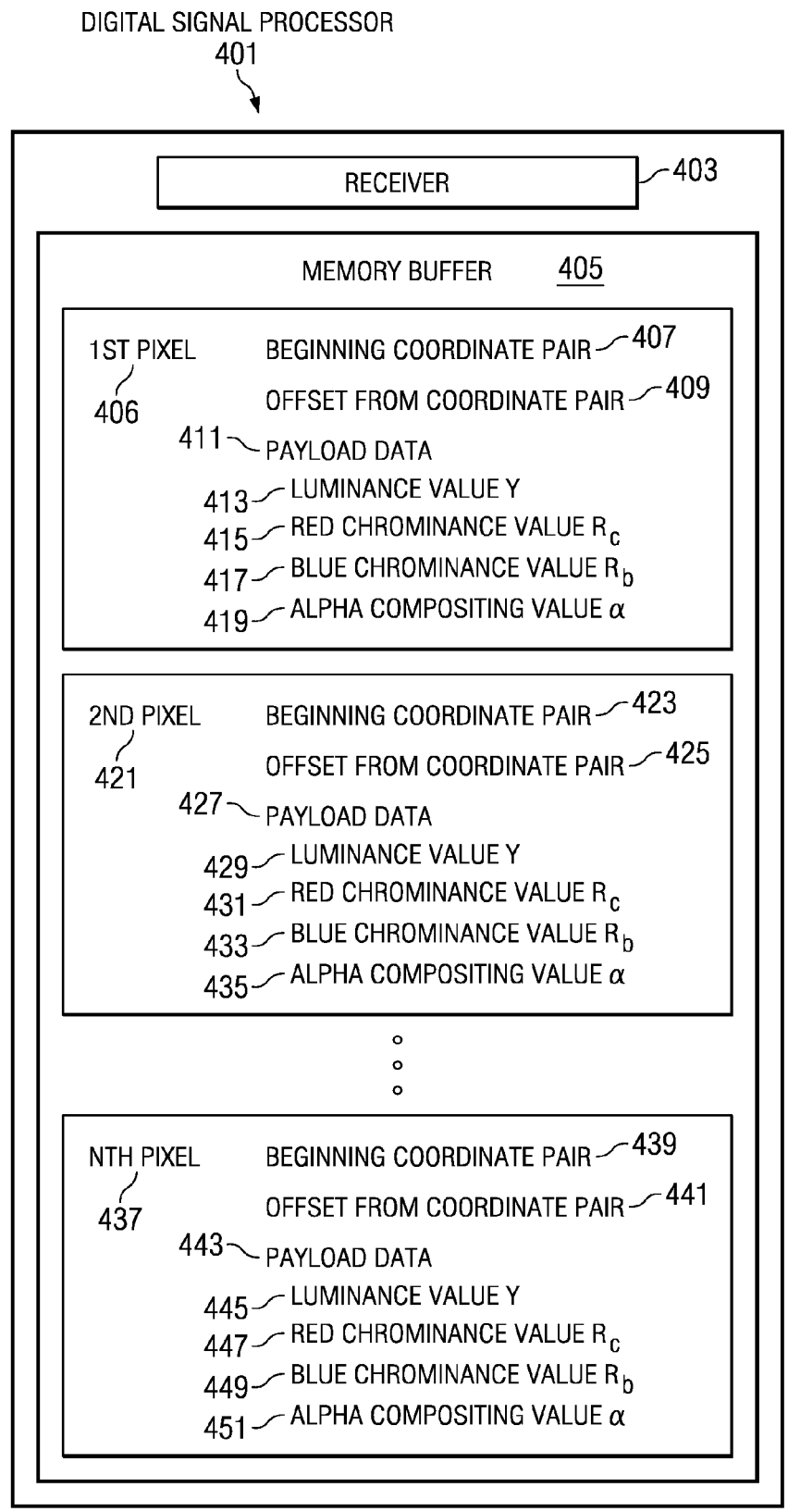
FIG. 4 is a diagram illustrating a storage scheme of rendered overlay content data in a DSP.

Referring now to FIG. 4, a diagram illustrating a storage scheme of rendered overlay content data in a DSP will be discussed and described. DSP 401 comprises at least a receiver 403 for receiving a rendered overlay content data. The rendered overlay content data take the forms of pixels and are stored in a memory buffer 405 which stores the rendered overlay content pixels as a data structure. The memory buffer 405 stores $1^{st}$ pixel data structure 406, $2^{nd}$ pixel data structure 421, through Nth pixel data structure 437. The $1^{st}$ pixel data structure 406 includes a beginning coordinate pair 407 that specifies a starting address where the overall image is to be displayed, such as the row and column on a bitmap of the overall video image as to the location of the row where the pixel being stored is located. The $1^{st}$ pixel data structure 406 also stores an offset 409 from the beginning coordinate pair indicating exactly where the $1^{st}$ pixel being stored will be located. The $1^{st}$ pixel data structure 406 further includes the payload data 411 which specifies the visual characteristics of the particular overlay content pixel being stored. Specifically, the payload data 411 includes the luminance value 413 Y, the red chrominance value $R_c$ 415, the blue chrominance value $R_b$ 417, and the alpha compositing value α 419 that make up the YUV format of the $1^{st}$ pixel represented by the $1^{st}$ pixel data structure 406. It should be noted that although the alpha compositing value α 419 is specific to the individual $1^{st}$ pixel being stored as the $1^{st}$ pixel data structure, the actual value α stored may applicable to an entire row of pixels or set of overlay content, as is indicated by the way the compositing value α is stored for entire overlay channels in FIG. 2.

The $2^{nd}$ pixel data structure 421 is similarly structured as the $1^{st}$ pixel data structure 406 and includes a beginning coordinate pair 423, an offset from the coordinate pair 425, and payload data 427 that includes the luminance value Y 429, the red chrominance value $R_c$ 431, the blue chrominance value $R_b$ 433, and the alpha compositing value α 435 that make up the YUV format of the $2^{nd}$ pixel represented by the $2^{nd}$ pixel data structure 421.

The Nth pixel data structure 437 is similarly structured as the $1^{st}$ pixel data structure 406 and the $2^{nd}$ pixel data structure 421 and includes a beginning coordinate pair 439, an offset from the beginning coordinate pair 441, and payload data 443 that includes the luminance value Y 445, the red chrominance value $R_c$ 447, the blue chrominance value $R_b$ 449, and the alpha compositing value α 451 that make up the YUV format of the Nth pixel represented by the Nth pixel data structure 437.

Figure 5:
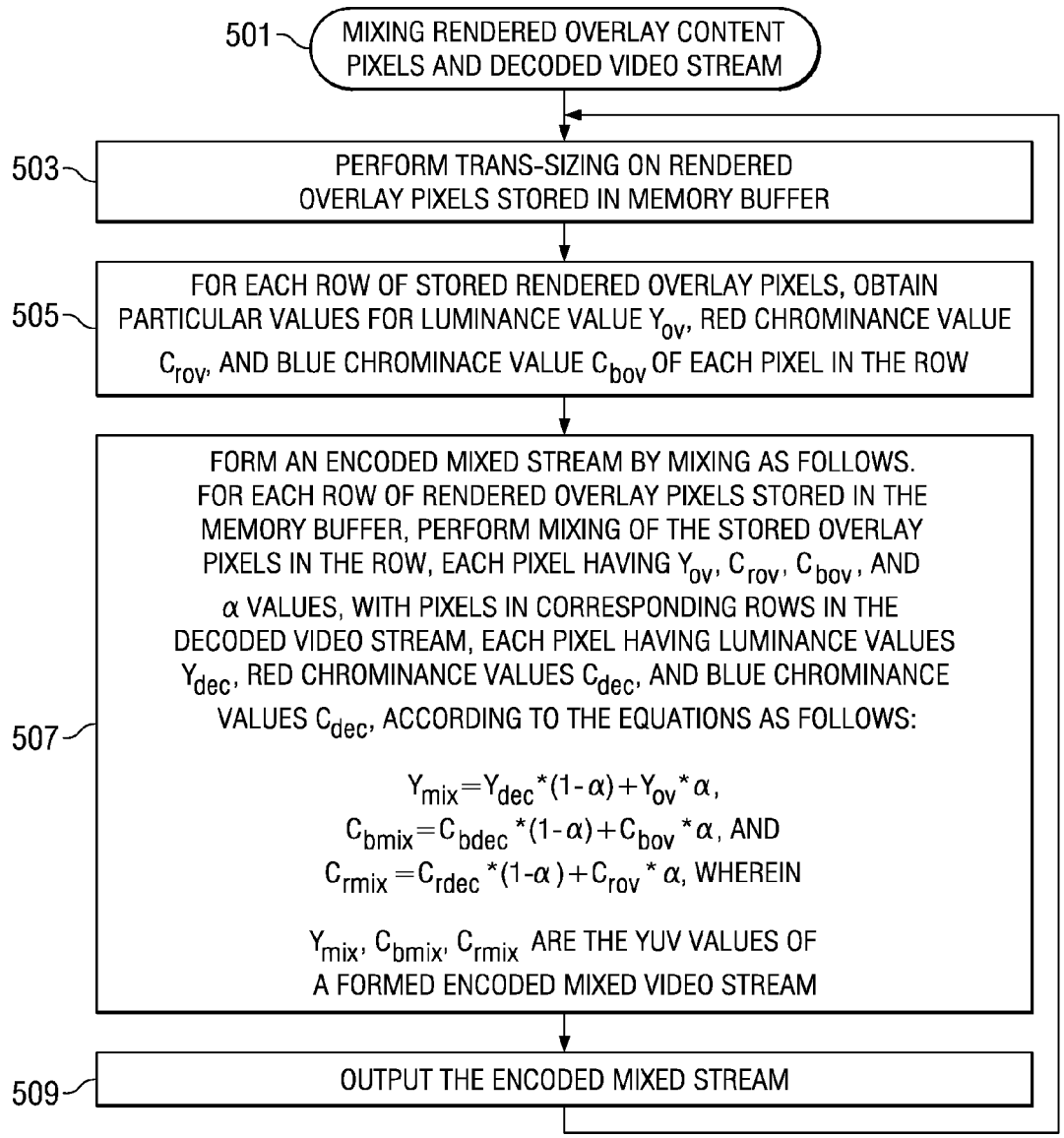
FIG. 5 is a flow chart illustrating a process of mixing rendered overlay content pixels stored in a memory buffer and a decoded video stream, thereby forming a encoded mixed stream.

As discussed above, typical overlay data is a very small portion of the entire mixed video stream content. The above described memory buffer 405 eliminates the need for a significant amount of memory to store zero values for Y, Cb, Cr that would be part of a conventional storage scheme for overlay data. The memory buffer 405 thus provides a more optimal utilization of memory than is conventional. The memory buffer 405 can be stored in flat access memory such as in the DSP Referring now to FIG. 5, a flow chart illustrating a process of mixing rendered overlay content pixels stored in a memory buffer and a decoded video stream, thereby forming a encoded mixed stream will be discussed and described. The process can be implemented on a media gateway such the one illustrated in FIG. 3. The mixing rendered overlay content pixels and decoded video stream process 501 performs transsizing 503 on rendered overlay pixels stored in a memory buffer such as that illustrated in FIG. 4.

The process includes obtaining 505 for each row of rendered overlay pixels stored in the memory buffer, for example, one row at a time, the particular luminance value Y, red chrominance value $C_r$, blue chrominance value $C_b$, and an alpha compositing value α of each pixel in the row. Then mixing 507 is performed on other pixels for example in a corresponding row of pixels from a decoded video stream and the row of overlay content pixels. A corresponding pixel in the decoded video stream can be characterized by YUV values $Y_{dec}$, $C_{bdec}$, and $C_{rdec}$ which are the luminance value, blue chrominance value, and red chrominance value respectively of each pixel in the decoded video stream.

The mixing 507 occurs according to the following formulas:

$$Y_{mix}=Y_{dec}*(1-\alpha)+Y_{ov}*\alpha,$$

$$C_{bmix}=C_{bdec}*(1-\alpha)+C_{bov}*\alpha, \text{ and}$$

$$C_{rmix}=C_{rdec}*(1-\alpha)+C_{rov}*\alpha, \text{ wherein}$$

$Y_{mix}$, $C_{bmix}$, $C_{rmix}$ are the YUV values of the encoded mixed stream. The mixing process continues until all the rows of rendered overlay pixels stored in the memory buffer are mixed. The process includes outputting 509 the encoded mixed stream comprising the pixels with YUV values $Y_{mix}$, $C_{bmix}$, $C_{rmix}$ to one or more decoder channels. The mixing process can be repeated.

The term "media gateway" as used herein refers to any of various hardware devices providing or communicating on packet networks, and connecting one network with a wide area network (WAN) or the Internet. The media gateway can include the functions of media streaming, an IP router, a multi-port Ethernet switch and/or a wireless access point. The media gateway may be located between a modem and the network, or a DSL or cable modem may be integrated into the media gateway.

The a hardware device that is equipped for interfacing with "decoder channel" means an input port of a media gateway device over which a video stream is received through known communication protocols, which includes special purpose hardware to convert the video stream from one video standard to a different video standard.

The term "decoded video stream" as used herein means a video image that has been transformed from a particular digital video standard format into a different video standard format, the data being carried piecemeal in packets. Digital video standards include for example MPEG-4, MPEG-2, MPEG-1, H.261, H.263, H.264, and variations and extensions thereof. Formatting denoting the beginning and ending of a unitary video stream are known.

The term "transport" as used herein means to receive data in one format and output the same data in a different format. Decoder channels and encoder channels can be referred to as transporting a video stream.

The term "receives" as used herein means receipt of signals over or from the internal circuitry of a device.

The term "overlay content" as used herein means information comprising a video image that is to be used as a secondary video image that when viewed, appears to be placed over or within a video stream which a primary video image which a user requested. The overlay content can be provided in known digital video standards mentioned above and/or image standards such as JPEG, TIFF, Adobe, bitmap (BMP), QUICKTIME, AVI, TARGA, EXIF, PCX, PICT, GIF, CALS, SUN RASTER, FPIX, PNGF, PPMF, PGMF, PBMF, WBMP, RPIX, DCM, and the like.

The term "overlay channel" as used herein means an input port of a media gateway device over which overlay content is received through known communication protocols, and which includes special purpose hardware to optionally convert the overlay content from one image or video standard to a different one.

The term "overlay renderer" as used herein means a software module and/or special purpose circuitry of the processor wherein overlay content is extracted and decoded as video data. The overlay renderer generates image data appropriate for display on a media gateway display. One of ordinary skill in the art will understand what an overlay renderer is.

The term "rendered overlay content" as used herein means overlay content that has been generated by an overlay renderer and is ready for display.

The term "video mixer" as used herein means a module of the processor that merges separate data from a decoded video stream and separate data of rendered overlay content to form an encoded mixed stream, that is, a single stream of data that represents a single video image with the overlay content overlaid on a video image. The encoded mixed stream is in a predetermined conventional format ready for display on the media gateway display. Any of various conventional video mixers can be appropriately used.

The term "mixes" as used herein refers to techniques by which a video mixer merges the separate data from a decoded video stream and separate data of rendered overlay content to form the encoded mixed stream, that is, a single stream of data that represents a single video image with the overlay content overlaid on a video image. The encoded mixed stream is in a predetermined conventional format ready for display on the media gateway display.

The term "encoded mixed stream" as used herein means a single stream of data that is a video image that is a mix of a video stream and overlay information that is in a predetermined conventional format ready for display on the media gateway device.

The term "encoder channel" as used herein means an output port of a media gateway device over which an encoded video stream is provided and is generally to be physically, wirelessly, and electronically connected to a display device to which it outputs the encoded mixed stream.

The term "overlay channel dedicated to text" as used herein means an overlay channel over which exclusively text, namely characters in UTF-8 and/or UTF-16 format, and variations and evolutions thereof, are transmitted as overlay content. The provided examples are not an exhaustive list.

The term "overlay channel dedicated to graphics" as used herein means an overlay channel over which exclusively static and moving graphics files, namely files according to graphic formats such as JPEG, MPEG, BMP, GIFF, and variations and evolutions thereof, are transmitted as overlay content. The provided examples are not an exhaustive list.

The term "static graphics" as used herein means overlay content that is a static, non-moving video image, including the JPEG, TIFF, and BMP formats, and evolutions and variations thereof. The provided examples are not an exhaustive list.

The term "overlay channel dedicated to encoded graphics" as used herein means an overlay channel over which exclusively encoded graphics files, are transmitted as overlay content.

The term "different overlay content" as used herein means overlay content is distinguishable when viewed as a video image from some other overlay content when viewed as a video image.

The terms "first rendered overlay content" and "second rendered overlay content" as used herein means an overlay content that has been rendered and a different overlay content that has been rendered, respectively.

The term "an advertisement overlaid on a video image" as used herein means rendered overlay content that is mixed with a video stream such that the overlay content, when viewed, promotes a service or good in a manner which is generally considered to be an advertisement.

The term "watermarking overlaid on a video image" as used herein means rendered overlay content that is mixed with a video stream such that the overlay content, when viewed, identifies the owner or originator of the video stream.

The term "business logo" as used herein means overlay content that, when view, identifies a brand.

The term "company logo" as used herein used herein means overlay content that, when view, identifies a brand associated with an incorporated entity.

The term "information alert" as used herein means overlay content that, when viewed, warns or notifies of a dangerous or otherwise newsworthy situation, and typically includes weather warnings and alerts, Amber alerts, and the like.

The term "first video image to be inserted within a larger video image" as used herein means overlay content that, when viewed, appears in conjunction with another video image as a picture within a picture.

The term "video image of an object that is inserted within a video image of an environment in which the object is located" as used herein means a video conferencing application wherein the overlay content is a smaller video image of a person or a thing inside a larger video image of the setting where the person or thing is located.

The term "receiver" as used herein means circuitry in a processor that accepts signals from outsider the processor in accordance with known techniques.

The term "pixel" as used herein means the smallest single item of information in a digital image.

The term "chrominance value" as used herein means the signal used in video systems to convey the color information of a pixel.

The term "luminance" as used herein means a measure of the brightness of a pixel.

The term "trans-sizing" as used herein means representing the stored overlay content differently from when received such that when viewed, the overlay content would be of a different size, that is, trans-sizing changes the picture size of the overlay content. Trans-sizing is sometimes referred to as image scaling.

The term "destination encoder channel" as used herein means an encoder channel that is identified by the processor as being the final recipient of particular rendered overlay content data after being mixed with a decoded video stream.

The term "animated text" as used herein is overlay content that is a text file but with additional coding to give the overlay content, when viewed, a textual appearance but with additional moving image characteristics, namely files according to a GIFF format, and evolutions and variations thereof. The example is not an exhaustive list.

It should be noted that this disclosure is intended to explain how to fashion and use various embodiments rather than to limit the true, intended, and fair scope and spirit of said embodiments. As discussed previously above, the invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A network media gateway comprising:
   a processor, configured to include:
      a plurality of decoder channels configured to transport a corresponding plurality of decoded video streams;
      a plurality of overlay channels configured to transport a corresponding plurality of overlay content;
      an overlay renderer configured to receive the plurality of overlay content transported by the plurality of overlay channels and outputs a first rendered overlay content that is stored in the processor;
      a video mixer configured to receive a plurality of decoded video streams transported by the plurality of decoder channels and the first rendered overlay content from the processor, and mixes the plurality of decoded video streams with the first rendered overlay content from the processor, thereby forming and outputting a plurality of encoded mixed streams;
      a plurality of encoder channels configured to receive the plurality of encoded mixed streams output by the video mixer according to an M×N matrix where each entry for M in M×N matrix identifies one of the plurality of encoder channels and each entry for N in the M×N matrix represents one of the plurality of overlay channels;
      each entry in the M×N matrix stores an alpha compositing value and a variable indicating whether the encoder channel and the overlay channel corresponding to the entry are interconnected; and
      the plurality of encoder channels further transports the plurality of encoded mixed streams.

2. The media gateway according to claim 1, wherein the plurality of overlay channels includes an overlay channel dedicated to text, an overlay channel dedicated to graphics, and an overlay channel dedicated to encoded graphics.

3. The media gateway according to claim 1, wherein the processor is configured to replace the first rendered overlay content stored by the processor with a second rendered overlay content data; and
   the video mixer is configured to mix the plurality of decoded video streams with the second rendered overlay content from the processor instead of the first rendered overlay content, thereby forming the plurality of encoded mixed steams with different overlay content.

4. The media gateway according to claim 1, wherein the overlay content data represents an advertisement to be overlaid on a video image.

5. The media gateway according to claim 1, wherein the overlay content data represents watermarking to be overlaid on a video image.

6. The media gateway according to claim 5, wherein the watermarking is a business logo.

7. The media gateway according to claim 1, wherein the overlay content data represents an information alert to be overlaid on a video image.

8. The media gateway according to claim 1, wherein the overlay content data represents a first video image that is inserted within a larger video image.

9. The media gateway according to claim 1, wherein the overlay content data represents a video image of an object to inserted within a video image of an environment in which the object is located.

10. A digital signal processor (DSP) embedded in a network media gateway, the DSP comprising:
    a receiver configured to receive overlay content data as rendered overlay content pixels;
    a memory buffer configured to store the received rendered overlay content pixels, each pixel being stored with the following information:
       a beginning coordinate pair of a pixel that represents the beginning of a row of pixels on which the pixel being stored is located,
       an offset from the beginning coordinate pair, and payload data that includes a luminance value Y, a red chrominance value $C_r$, a blue chrominance value $C_b$, and an alpha compositing value α0 particular to pixel being stored; and a processor configured to receive a first decoded video stream and mixes the first decoded video stream with the rendered overlay content pixels stored in the memory buffer, and to receive a different second decoded video stream and mix the second decoded video stream with the same overlay content pixels stored in the memory buffer;

the DSP further implements the following steps:

performing trans-sizing of the stored rendered overlay content pixels stored in the memory buffer based on a destination encoder channel;

for each row of pixels stored in the memory buffer, mixing the stored rendered overlay content pixels in the row of pixels and the pixels in corresponding rows of pixels in each of the decoded video streams to form encoded mixed streams according to the following equations:

$Y_{mix} = Y_{dec}*(1-\alpha) + Y_{ov}*\alpha,$ $C_{bmix} = C_{bdec}*(1-\alpha) + C_{bov}*\alpha,$ and $C_{rmix} = C_{rdec}*(1-\alpha) + C_{rov}*\alpha,$ wherein $Y_{mix}, C_{bmix},$ and $C_{rmix}$ are the luminance values, blue chrominance values, and red chrominance values, respectively, of the pixels in each encoded mixed stream, and $Y_{dec}, C_{bdec},$ and $C_{rdec}$ are the luminance values, blue chrominance values, and red chrominance values, respectively, of the pixels in each decoded video stream; and outputting, by the DSP, the encoded mixed streams.

11. A method implemented on a digital signal processor (DSP) of mixing rendered overlay content pixels stored in a memory buffer and a decoded video stream, thereby forming a encoded mixed stream, each pixel of the rendered overlay content pixels being stored with a beginning coordinate pair of a pixel that represents the beginning of a row of pixels on which the pixel being stored is located, an offset from the beginning coordinate pair, and payload data that includes a luminance value $Y_{ov}$, a red chrominance value $C_{rov}$, a blue chrominance value $C_{bov}$, and an alpha compositing value α particular to the pixel being stored, the method comprising:

performing, by the DSP, trans-sizing of the stored rendered overlay content pixels stored in the memory buffer based on a destination encoder channel;

for each row of pixels stored in the memory buffer, mixing by the DSP the stored rendered overlay content pixels in the row and the pixels in corresponding rows of pixels in the decoded video stream to form a an encoded mixed stream according to the following equations:

$Y_{mix} = Y_{dec}*(1-\alpha) + Y_{ov}*\alpha,$ $C_{bmix} = C_{bdec}*(1-\alpha) + C_{bov}*\alpha,$ and $C_{rmix} = C_{rdec}*(1-\alpha) + C_{rov}*\alpha,$ wherein $Y_{mix}, C_{bmix},$ and $C_{rmix}$ are the luminance values, blue chrominance values, and red chrominance values, respectively, of the pixels in the encoded mixed stream, and $Y_{dec}, C_{bdec},$ and $C_{rdec}$ are the luminance values, blue chrominance values, and red chrominance values, respectively, of the decoded video stream; and outputting, by the DSP, the encoded mixed stream.

12. The method according to claim 11, wherein the rendered overlay content pixels stored in the memory buffer represent text.

13. The method according to claim 11, wherein the rendered overlay content pixels stored in the memory buffer represent static graphics.

14. The method according to claim 13, wherein the static graphics is a company logo.

15. The method according to claim 11, wherein the rendered overlay content pixels stored in the memory buffer represent animated text.

16. A network media gateway comprising:

an embedded digital signal processor(DSP) comprising:

a receiver configured to receive overlay content data as rendered overlay content pixels;

a memory buffer configured to store the received rendered overlay content pixels, each pixel being stored with the following information:

a beginning coordinate pair of a pixel that represents the beginning of a row of pixels on which the pixel being stored is located, an offset from the beginning coordinate pair, and payload data that includes a luminance value Y, a red chrominance value $C_r$, a blue chrominance value $C_b$, and an alpha compositing value α particular to pixel being stored; and a processor function configured to receive a first decoded video stream and mixes the first decoded video stream with the rendered overlay content pixels stored in the memory buffer, and to receive a different second decoded video stream and mix the second decoded video stream with the same rendered overlay content pixels stored in the memory buffer, configured to include:

a plurality of decoder channels configured to transport a corresponding plurality of decoded video streams;

a plurality of overlay channels configured to transport a corresponding plurality of overlay content;

an overlay renderer configured to receive the plurality of overlay content transported by the plurality of overlay channels and outputs a first rendered overlay content that is stored in the processor;

a video mixer configured to receive a plurality of decoded video streams transported by the plurality of decoder channels and the first rendered overlay content from the processor, and mixes the plurality of decoded video streams with the first rendered overlay content from the processor, thereby forming and outputting a plurality of encoded mixed steams;

an encoder channel configured to receive the plurality of encoded mixed streams output by the video mixer and transports the plurality of encoded mixed streams a digital signal processor;

the DSP further implements the following steps:

performing trans-sizing of the stored rendered overlay content pixels stored in the memory buffer based on a destination encoder channel;

for each row of pixels stored in the memory buffer, mixing the stored rendered overlay content pixels in the row of pixels and the pixels in corresponding rows of pixels in each of the decoded video streams to form encoded mixed streams according to the following equations:

$Y_{mix} = Y_{dec}*(1-\alpha) + Y_{ov}*\alpha,$ $C_{bmix} = C_{bdec}*(1-\alpha) + C_{bov}*\alpha,$ and $C_{rmix} = C_{rdec}*(1-\alpha) + C_{rov}*\alpha,$ wherein $Y_{mix}$, $C_{bmix}$, and $C_{rmix}$ are the luminance values, blue chrominance values, and red chrominance values, respectively, of the pixels in each encoded mixed stream, and $Y_{dec}$, $C_{bdec}$, and $C_{rdec}$ are the luminance values, blue chrominance values, and red chrominance values, respectively, of the pixels in each decoded video stream; and outputting, by the DSP, the encoded mixed streams.

17. The media gateway according to claim 16, wherein the overlay content data represents an advertisement to be overlaid on a video image.

18. The media gateway according to claim 16, wherein the overlay content data represents watermarking to be overlaid on a video image.

19. The media gateway according to claim 18, wherein the watermarking is a business logo.

20. The media gateway according to claim 16, wherein the overlay content data represents an information alert to be overlaid on a video image.

21. The media gateway according to claim 16, wherein the overlay content data represents a first video image that is inserted within a larger video image.

22. The media gateway according to claim 16, wherein the overlay content data represents a video image of an object to inserted within a video image of an environment in which the object is located.

* * * * *